US011520732B2

(12) United States Patent
Kumar et al.

(10) Patent No.: US 11,520,732 B2
(45) Date of Patent: Dec. 6, 2022

(54) SYSTEMS AND TOOLS FOR DATA ARCHIVING

(71) Applicant: SAP SE, Walldorf (DE)

(72) Inventors: Pavan Kumar, Bangalore (IN); Pradeep Kumar Singh, Azamgarh (IN); Shree Sheshadri, Mysore (IN); Gerd Ritter, Heidelberg (DE)

(73) Assignee: SAP SE, Walldorf (DE)

(*) Notice: Subject to any disclaimer, the term of this patent is extended or adjusted under 35 U.S.C. 154(b) by 228 days.

(21) Appl. No.: 16/902,716

(22) Filed: Jun. 16, 2020

(65) Prior Publication Data

US 2021/0390077 A1  Dec. 16, 2021

(51) Int. Cl.
*G06F 16/11* (2019.01)
*G06F 16/16* (2019.01)
*G06F 16/22* (2019.01)
*G06F 16/182* (2019.01)

(52) U.S. Cl.
CPC .......... *G06F 16/113* (2019.01); *G06F 16/162* (2019.01); *G06F 16/168* (2019.01); *G06F 16/1824* (2019.01); *G06F 16/2228* (2019.01)

(58) Field of Classification Search
CPC .. G06F 16/113; G06F 16/162; G06F 16/1824; G06F 16/2228
See application file for complete search history.

(56) References Cited

U.S. PATENT DOCUMENTS

| | | | | |
|---|---|---|---|---|
| 8,990,163 | B2* | 3/2015 | Fischer | G06F 16/00 707/649 |
| 9,069,778 | B1* | 6/2015 | Bent | G06F 11/1482 |
| 9,405,828 | B2* | 8/2016 | Wilkins | G06F 16/61 |
| 10,437,791 | B1* | 10/2019 | Bebchuk | G06F 16/1734 |
| 10,558,612 | B1* | 2/2020 | Schiel | G06F 16/258 |
| 2011/0264666 | A1* | 10/2011 | Gieseke | G06F 16/2228 707/E17.085 |
| 2013/0080383 | A1* | 3/2013 | Herbst | G06F 16/113 707/600 |

* cited by examiner

*Primary Examiner* — James Trujillo
*Assistant Examiner* — Michal Bogacki
(74) *Attorney, Agent, or Firm* — Buckley, Maschoff & Talwalkar LLC

(57) ABSTRACT

Systems and methods to select an object instance from a database storage to archive to an external storage based on an archiving configuration and attribute values of the object instance, transmit the selection to an application associated with the object instance, determine, based on a response received from the application, to archive the object instance, mark the object instance as ready for archiving, identify the object instance as ready for archiving, convert the object instance to an object notation format, transmit the converted object instance to a cloud application for storage in an external storage, in response to a determination that the storage in the external storage is successful, create an index object in the database storage including a subset of fields of the object instance and a link to the converted object instance stored in the external storage, and mark the object instance in the database storage as archived.

22 Claims, 8 Drawing Sheets

700

| Referencing Object | Referenced Object | Type Code | Original Type Code |
|---|---|---|---|
| A123 | B345 | TypeX | |
| A123 | C044 | TypeY | |
| A123 | C994 | TypeY | |
| A125 | A123 | TypeZ | |

| Referencing Object | Referenced Object | Type Code | Original Type Code |
|---|---|---|---|
| A123 | B345 | TypeX | |
| A123 | C044 | unknown | TypeY |
| A123 | C994 | TypeY | |
| A125 | A123 | TypeZ | |

*FIG. 7B*

SYSTEMS AND TOOLS FOR DATA ARCHIVING

BACKGROUND

Modern database systems store vast amounts of data for their respective enterprises. The data may include transactional data, master data, unstructured data and other data. Some database systems are capable of storing data of an entire database in volatile memory, thereby facilitating fast read and write access to such "in-memory" data.

A significant portion of data stored in a database may include data that is no longer actively used. The presence of such data can be distracting to users and increases the time required to copy the database or perform other lifecycle operations. This data can undesirably increase Total Cost of Ownership (TCO) of a database system without providing commensurate benefits, particularly in the case of in-memory database systems which use expensive volatile memory.

Database systems may also store data which is subject to country-specific data privacy regulations. For example, regulations may impose an obligation to "forget" personal data and/or to make such data available solely for audit purposes and not for operational purposes. Such regulations apply to the data itself and to change logs which specify what data was changed, by whom, and when.

Data archiving is intended to move data which is no longer active to revision-safe storage. However, conventional systems fail to provide efficient mechanisms for identification of data suitable for archiving and lifecycle management thereof.

BRIEF DESCRIPTION OF THE DRAWINGS

FIGS. 7A and 7B are tabular representations of a data structure to store object references according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

Some embodiments operate to efficiently establish criteria for archiving object instances, select object instances for archiving based on the criteria, archive the selected object instances, support searching of the archived object instances, and handle object instances deletion. Reducing the amount of occupied memory may improve memory usage, reduce hardware costs and reduce downtime required for tenant lifecycle operations (e.g., move, copy, refresh, restore).

For purposes of the present description, an object is defined by metadata and comprises a logical container for data. In the enterprise context, objects may include Opportunities, Leads, and Quotes. Object instances are specific instantiations of an object and include data associated with the specific instantiation, such as a specific Opportunity, a specific Lead, and a specific Quote.

Figure 1:
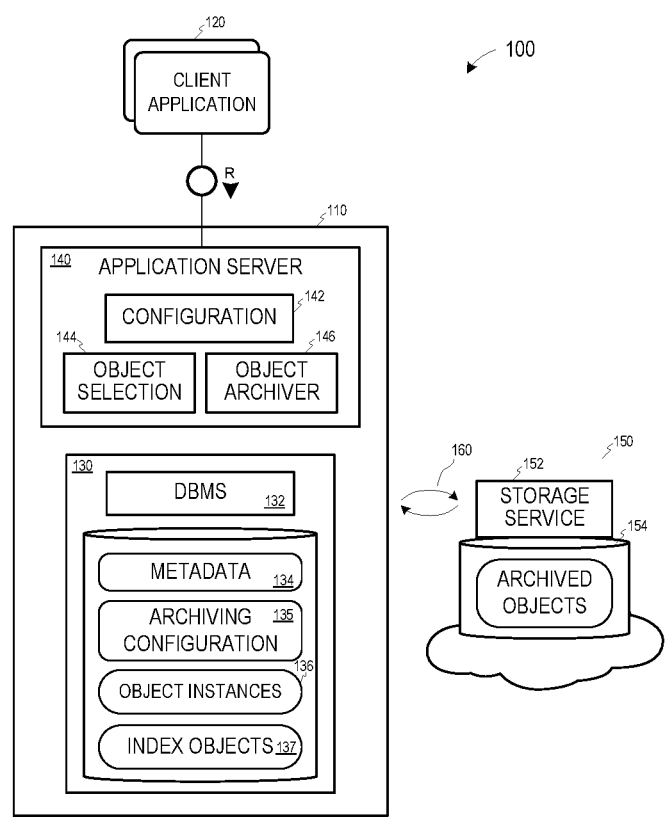
FIG. 1 is a block diagram of a system to select object instances for archiving and archive the selected object instances to an external storage according to some embodiments.

FIG. 1 is a block diagram of system 100 according to some embodiments. The illustrated elements of system 100 may be implemented using any suitable combination of computing hardware and/or software that is or becomes known. In some embodiments, two or more elements of system 100 are implemented by a single computing device. One or more elements of system 100 may be implemented as a cloud service (e.g., Software-as-a-Service, Platform-as-a-Service).

Generally, platform 110 receives queries from client applications 120 and returns results thereto based on data stored within database server 130. Database server 130 may comprise any combination of volatile memory (e.g., Random Access Memory (RAM)) and non-volatile memory (e.g., fixed disk, Flash memory, non-volatile (RAM)).

Platform 110 executes program code to provide application server 140. Application server 140 provides services for executing server-side code such as components 142, 144 and 146. Each component of application server 140 may be implemented by processor-executable program code written in any suitable programming language. Some of such code may be deployed in more than one component of application server 140. For example, configuration component 142 executing on application server 140 may receive HyperText Transfer Protocol (HTTP) requests from client applications 120 and return data from database server 130 in response thereto.

More specifically, according to some embodiments, client applications 120 may comprise a Web browser which is pointed to a Uniform Resource Locator (URL) served by configuration component 142. Configuration component 142 may thereby provide a user interface through which a system administrator specifies criteria for identifying object instances to be archived.

Configuration component 142 may allow setting of only certain parameter values within the default set or may allow any degree of editability of the default set and specified parameter values. In one example, configuration component 142 allows the system administrator to set an object type-specific "archiving age". The criteria for identifying object instances to be archived may be stored in archiving configuration 135.

According to some embodiments, configuration component 142 specifies the criteria using a "default set" of pre-defined queries. A system administrator or key user may edit the default set to include any desired criteria for identifying objects to be archived such as, Country, Opportunity type, etc.

In some embodiments, the default set used to select objects to archive may be defined and edited using the same key user software tools which a key user uses to define other work lists of user-relevant object instances for day-to-day operations. For example, just as a work list may be defined as "My open Quotes in South Africa", a default set for archiving selection may specify "Sales Orders in Germany older than 2 years" and "Sales Orders in France older than 2 years". The selection criteria may select from standard object fields as well as customer extension fields.

Object selection component 144 may be executed to select object instances of object instances 136 for archiving based on archiving configuration 135 and on attribute values of the object instances. For example, if archiving configuration 135 specifies an archiving age of 100 days for Sales Order objects, object selection 144 will query object instances 136 for Sales Order objects having a "last changed date" attribute value of at least 100 days ago. The identified object instances will be selected, for example by marking them as 'Ready For Archiving'.

According to some embodiments, object selection component 144 identifies object instances of object instances 136 for archiving based on archiving configuration 135 and then performs veto checks to determine whether each identified object instance should be archived. For example, object selection component 144 may provide exits for applications to receive the selection of an object instance and to indicate to component 144 whether or not the object instance should be archived. An application may indicate that the object instance should not be archived based on another object instance which closely depends on the identified object instance. Alternatively, the application may indicate that the closely-identified object instance should also be archived. Only object instances which pass the veto check are then marked as 'Ready For Archiving'.

Object archiver 146 periodically determines all object instances which have been marked as 'Ready For Archiving' and transmits them to storage service 152 of external object storage platform 150, for storage in storage 154. External object storage platform 150 may comprise a scalable, flexible, and cost-effective cloud storage solution that allows storage of large amounts of unstructured data as 'Objects'. In some embodiments, object archiver 146 serializes the object instances into an object notation format prior to transmitting the object instances to storage service 152. Object archiver 146 may then set the status of the object instance to "Archived".

Object archiver 146 may also create an index object 137 corresponding to each archived object instance. An index object includes a reference to the external file containing the archived object instance and a set of searchable fields from the archived object instance. The fields may assist in identifying the archived object instance in a subsequent free text or field-based search.

According to some embodiments, the original object instance is not deleted after archiving. For example, the original object instance may be maintained in object instances 136 for 90 days. During those 90 days, archiving configuration 135 may be changed such that a previously-archived object instance no longer satisfies the criteria of archiving configuration 135. In such a case, object selection component 144 may change the status of the object instance so that it is no longer marked as "Archived".

Typically, accessing an object instance which refers to a deleted object instance may result in a "referenced object not found" error or the like. Once the original object instance is deleted, some embodiments manipulate references to the object instance to avoid future errors. For example, and as will be described in detail below, the reference to the deleted object instance may be changed in a reversible manner such that the reference is ignored during access to the referencing object instance.

Figure 2:
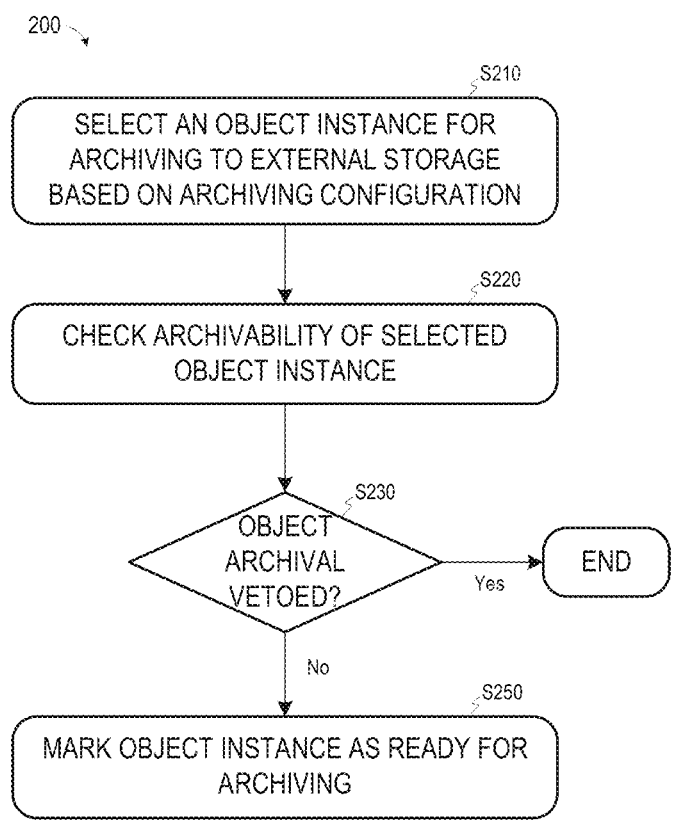
FIG. 2 is a flow diagram of a process to select object instances for archiving according to some embodiments.

FIG. 2 comprises a flow diagram of process 200 to mark object instances as 'Ready for Archiving' according to some embodiments. Process 200 will be described below with respect to a single object instance for clarity. Object selection component 144 may execute process 200 but embodiments are not limited to thereto.

Process 200 and all other processes mentioned herein may be embodied in computer-executable program code read from one or more of non-transitory computer-readable media, such as a hard disk drive, a volatile or non-volatile random access memory, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 may execute as a background job according to any suitable schedule. Initially, at S210, an object instance is selected for archiving to external storage. The selection is based on an archiving configuration.

The archiving configuration may be defined using a default set of pre-defined queries. According to some embodiments, the default set exposes a 'last change date' attribute. The 'last change date' attribute can be mapped to any data field of an object. In some embodiments of S210, a value of this attribute is compared against a current date and an 'archiving age' value to identify object instances which are deemed old enough for archiving. The archiving age may be defined by the system administrator on an object-specific basis.

Figure 3:
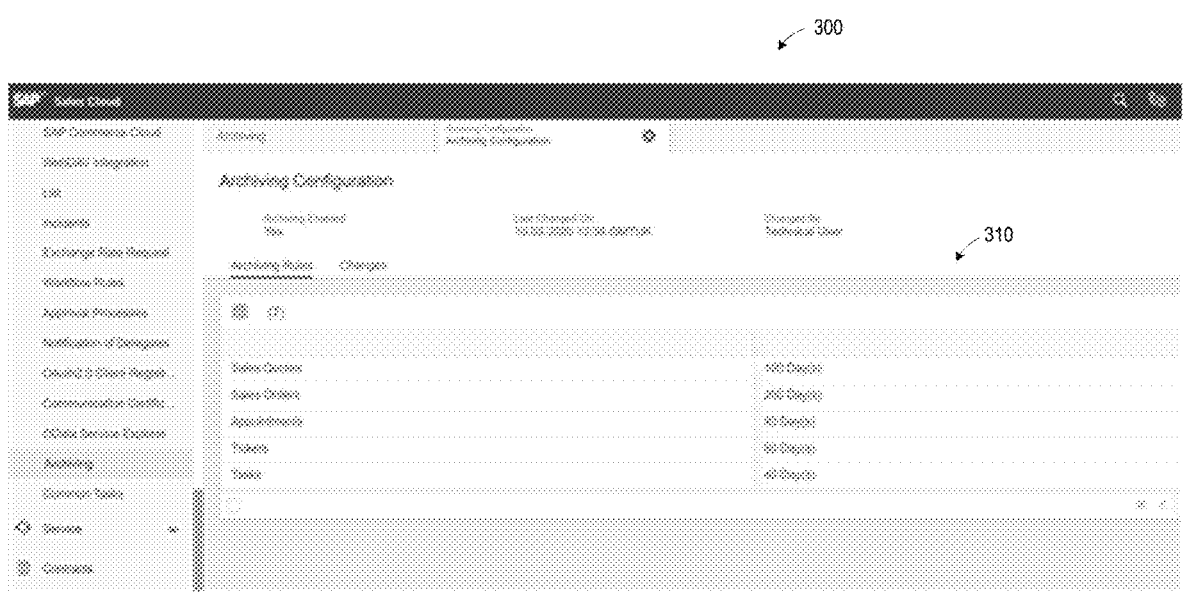
FIG. 3 is a user interface to specify an archiving configuration according to some embodiments.

FIG. 3 depicts user interface 300 which may be used to define an archiving age according to some embodiments. User interface 300 may be presented by a Web browser of a system in communication with configuration component 142 of system 100. In this regard, configuration component 142 may comprise server-side JavaScript to interact with client-side code executing within a virtual machine of the Web browser.

Area 310 of user interface 300 lists object types and, for each object type, a corresponding archiving age. For example, based on the archiving ages shown in FIG. 3, all Sales Quote object instances having a last change date greater than or equal to 100 days from the present date are identified at S210. According to some embodiments, a system administrator may manipulate user interface 300 to change the archiving age associated with any of the object types. As mentioned above, the system administrator may define any suitable query (i.e., archiving configuration) for use in identifying object instances to be archived.

The suitability of the selected object instance for archiving is selected at S220. For example, a "Check Archivability" action may be called to determine whether any objects depend on the selected object instance (e.g., for consistency reasons or for further processing). If so, the other object may raise a veto to prevent archiving of the given object instance. Process 200 terminates if it is determined at S230 that such a veto has been raised. If no veto is raised, the object instance is marked as 'Ready For Archiving' at S250.

Process 200 may be performed periodically in some embodiments. Performance of process 200 may include performance for all object instances of a first object type with respect to an archiving configuration associated with the first object type, then for all object instances of a second object type with respect to an archiving configuration associated with the second object type, and so on.

Figure 4:
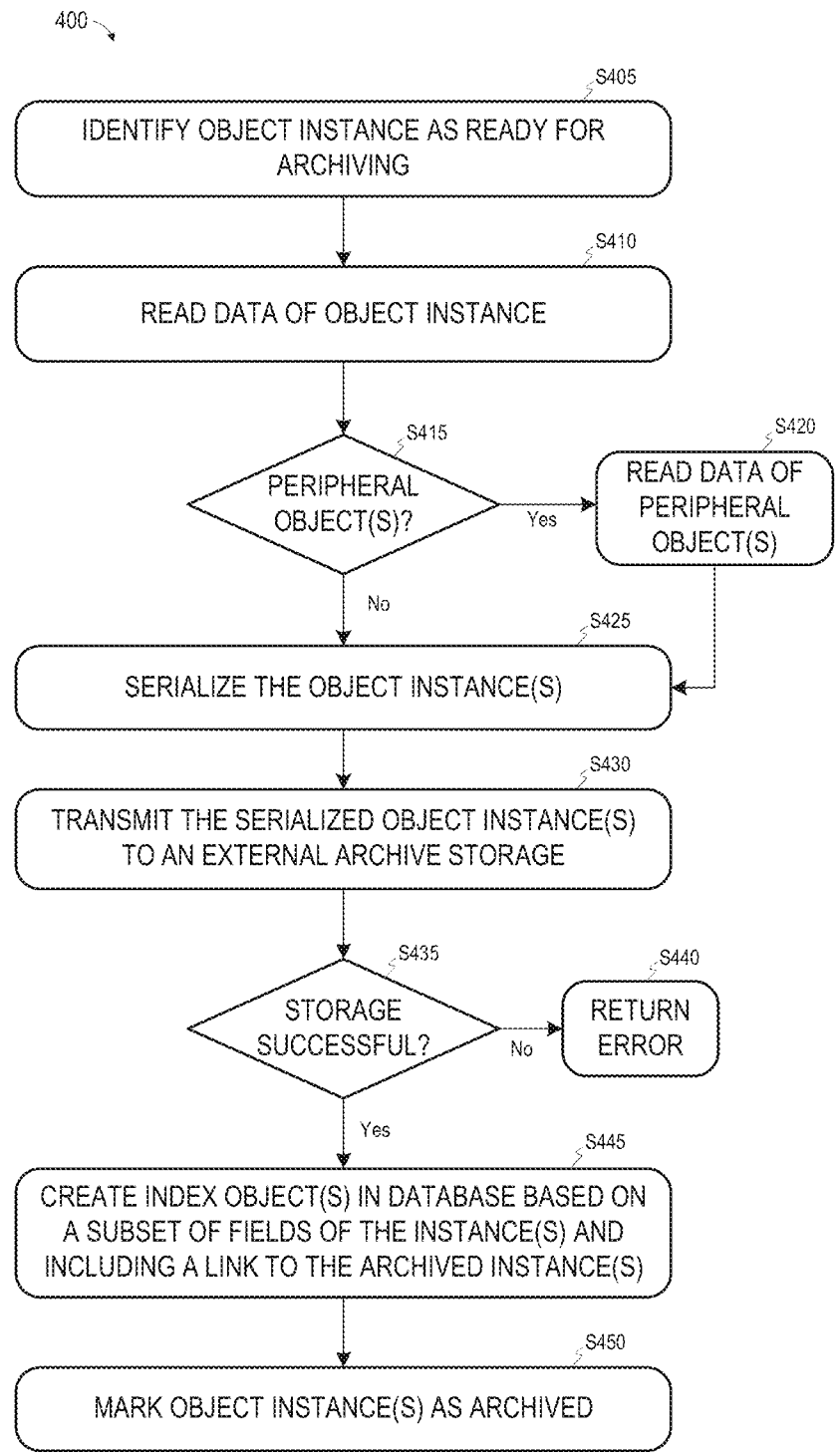
FIG. 4 is a flow diagram of a process to archive an object instance according to some embodiments.

FIG. 4 is a flow diagram of process 400 to archive an object instance according to some embodiments. Process 400 may be performed independently of process 200. For example, objection selection component 144 may execute process 200 according to a time and/or event-triggered schedule to mark object instances as 'Ready For Archiving', while object archiver component 146 executes process 400 according to a different schedule in order to archive any object instances which have been marked as 'Ready For Archiving'.

Figure 5A:
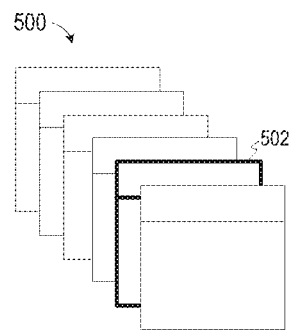
FIGS. 5A through 5D illustrate archival of object instances according to some embodiments.
Figure 5B:
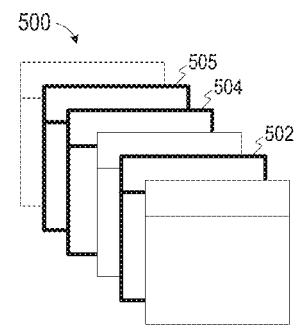

For example, FIG. 5A illustrates object instances 500. Object instance 502 has been marked as 'Ready For Archiving' as described above with respect to process 200. FIG. 5B illustrates object instances 500 at a later time, and prior to execution of process 400, at which object instances 504 and 505 have also been marked as 'Ready For Archiving' as described above.

Process 400 begins with identification of an object as ready for archiving at S405. Such identification may comprise performing a query that selects all object instances that are in a 'Ready for Archiving' state. The data of the identified object instance is read at S410.

S415 is a determination of whether any peripheral object instances should be archived along with the identified object instance. For example, an application exit may be called, allowing applications to add additional object instances of the same or other object types to the selection of object instances. If one or more object instances are added in this manner, flow proceeds to S420 to read the data of the peripheral object instances.

All selected object instances are serialized at S425. Serialization may comprise conversion of each object instance into a corresponding JSON (JavaScript Object Notation)-formatted file. The serialized object(s) are transmitted to an external archive storage at S430.

According to some embodiments of S430, object archiver component 146 pushes the converted object to a proxy which in turn authenticates with a cloud application and provides converted object to the cloud application via a multipart HTTP request. In response, the cloud application communicates with storage service 152 to store the converted object in object storage 154.

At S435, it is determined whether the storage was successful. According to some embodiments, the aforementioned proxy calculates a digest (e.g., crypto-code) based on the content of the converted object prior to transmission to the cloud application. The digest is provided along with the object content in the HTTP request at S430. Upon receipt, the cloud application calculates the digest based on the object content and compares the received digest to the calculated digest. If the digests match, the storage is considered successful. If the storage is not successful, an error is returned at S440. Flow proceeds to S445 if the storage was successful.

At S445, an index object is created in the database for each archived object instance. An index object is created based on a subset of the fields of the corresponding object instance, and includes a link to its corresponding index. Index objects typically exhibit a much smaller memory footprint than the corresponding object instances and allow search of and navigation to the archived data. The archived object instances are marked as 'Archived' at S450.

Figure 5C:
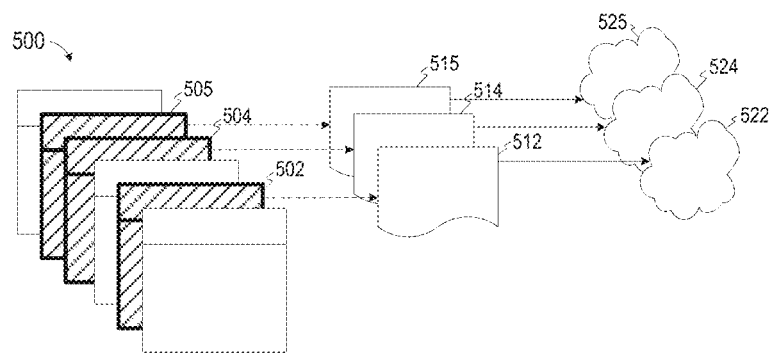

FIG. 5C illustrates object instances 500 after process 400 according to some embodiments. Object instances 502, 504 and 505 are marked as 'Archived'. Also, each of archived object instances 502, 504 and 505 is associated with one of index objects 512, 514 and 515 created at S445. As noted, each of index objects 512, 514 and 515 includes a link to corresponding externally-stored archived object 522, 524 and 526. Archived object instances 502, 504 and 505 and index objects 512, 514 and 515 remain stored in the database server until object instances 502, 504 and 505 are deleted as described below.

Figure 6:
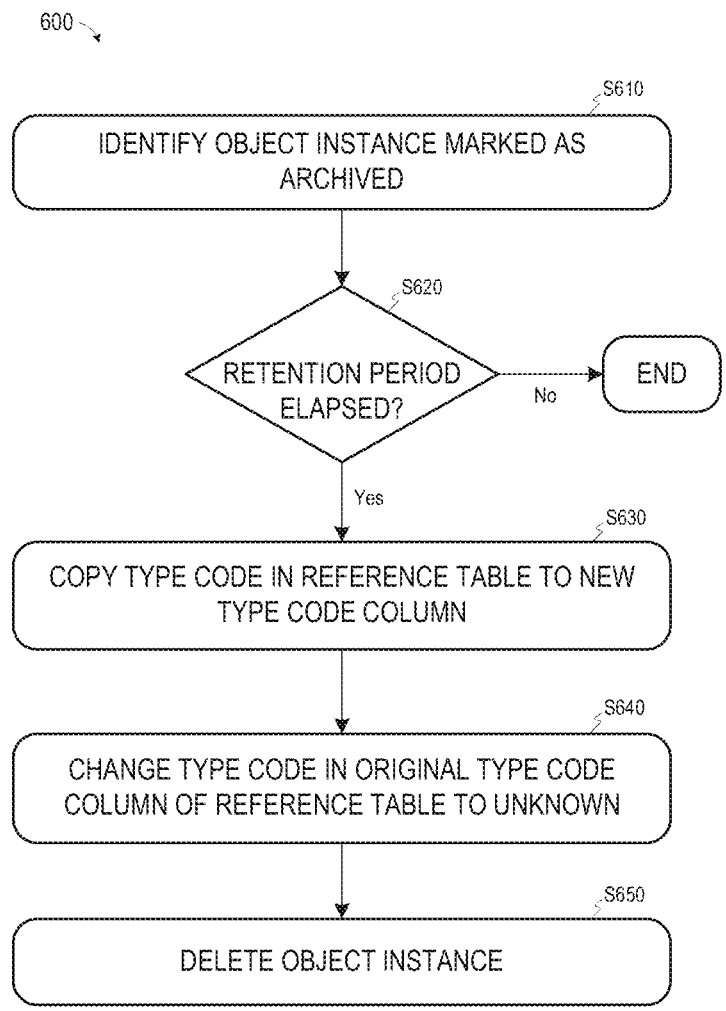
FIG. 6 is a flow diagram of a process to delete an archived object instance according to some embodiments.

FIG. 6 is a flow diagram of process 600 to delete an archived object instance from the database server according to some embodiments. As described above, the archived object instances may be maintained in the database server for a retention period in order to correct any errors in or otherwise change the archiving configuration. Any object instances which are marked as 'Archived' but which do not conform to the changed archiving configuration can then be un-marked during the selection at S210 of process 200.

Initially, at S610, a stored object instance marked as 'Archived' is identified. As above, process 600 may comprise a batch process in which several object instances are identified at S610 and each one is processed as described below. At S620, it is determined is a retention period (e.g., 90 days) has elapsed since the archiving of the object instance. The retention period may be configured based on object type in some embodiments.

Flow proceeds to S630 if the retention period has elapsed and terminates if not. It is assumed that a reference table exists which specifies object instances which refer to the archived object instance. The reference table specifies a type code of the archived object instance. For example, FIG. 7A illustrates reference table 700 associating referencing objects with referenced objects and type codes.

At S630, the type code of the archived object instance in the reference table is copied to a new type code column. Next, the type code in the original type code column is changed to a dummy value, such as "unknown". FIG. 7B illustrates the changes of S630 and S640 as applied to reference table 700 of FIG. 7A. S630 and S640 are intended to avoid errors which may occur during access of an object which references the archived object instance if the archived object instance is deleted from the database server.

Figure 5D:
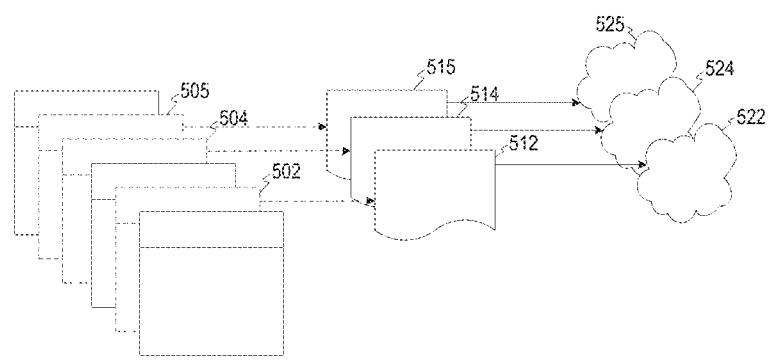

The archived object instance is deleted from the database server at S650. As noted in process 400, an index object associated with the deleted object instance is maintained in the database server to allow searching and retrieval of the object instance. FIG. 5D depicts the deletion of object instances 502, 504 and 505 at S650, along with still-stored index objects 512, 514 and 515.

Figure 8:
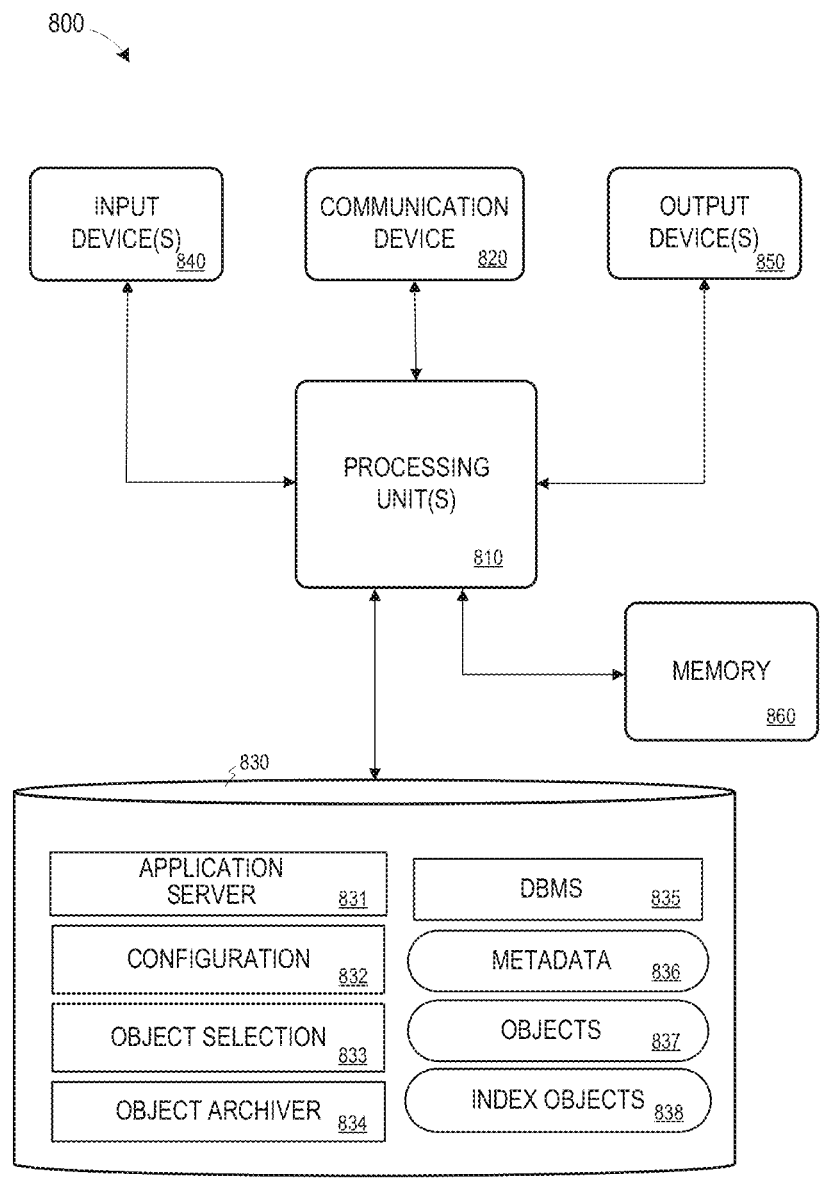
FIG. 8 is a block diagram of a platform server according to some embodiments.

FIG. 8 is a block diagram of database server 800 according to some embodiments. Database server 800 may comprise a general-purpose computing apparatus and may execute program code to perform any of the functions described herein. Database server 800 may comprise an implementation of database server 100 or 300 in some embodiments. Database server 800 may include other unshown elements according to some embodiments.

Database server 800 includes processing unit(s) 810 operatively coupled to communication device 820, data storage device 830, one or more input devices 840, one or more output devices 850 and memory 860. Communication device 820 may facilitate communication with external devices, such as an external network, the cloud, or a data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into apparatus 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, and RAM devices, while memory 860 may comprise a RAM device.

Application server 831, application 832, agent 833 and consumer proxy 834 may each comprise program code executed by processing unit(s) 810 to cause server 800 to perform any one or more of the processes described herein. Embodiments are not limited to execution of these processes by a single computing device.

Database Management System (DBMS) 835 may comprise a DBMS as is known in the art, and metadata 836 and data 837 may comprise any suitable metadata and data as described herein. Data storage device 830 may also store data and other program code for providing additional functionality and/or which are necessary for operation of database server 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processing unit to execute the processor-executable process steps to cause the system to:
identify a first archiving configuration of a first type of object instance, the first archiving configuration including first parameter values;
select an object instance of the first type of object instance from a database storage to archive to an external storage based on the first archiving configuration and a comparison of the first parameter values with attribute values of the object instance;
transmit the selection to an application associated with the object instance;
determine, based on a response received from the application, to archive the object instance;
mark the object instance as ready for archiving;
identify the object instance as ready for archiving;
convert the object instance to an object notation format;
transmit the converted object instance to a cloud application for storage in an external storage;
in response to a determination that the storage in the external storage is successful, create an index object in the database storage including a subset of fields of the object instance and a link to the converted object instance stored in the external storage; and
mark the object instance in the database storage as archived.

2. A system according to claim 1, the processing unit to execute the processor-executable process steps to cause the system to:
determine a peripheral object instance associated with the object instance;
convert the peripheral object instance to the object notation format; and
transmit the converted peripheral object instance to the cloud application for storage in the external storage.

3. A system according to claim 1, wherein selection of the object instance, transmission of the selection to an application, determination to archive the object instance, and marking the object instance as ready for archiving are performed by a first process, and
wherein the identification of the object instance as ready for archiving, conversion of the object instance to an object notation format, transmission of the converted object instance to a cloud application for storage in an external storage, creation of the index object, and marking of the object instance as archived are performed by a second process.

4. A system according to claim 1, the processing unit to execute the processor-executable process steps to cause the system to:
select a second object instance of the first type of object instance from the database storage to archive to the external storage based on the first archiving configuration and a comparison of the first parameter values with attribute values of the second object instance;
transmit the selection of the second object instance to the application; and
determine, based on a second response received from the application, to not archive the second object instance.

5. A system according to claim 1, the processing unit to execute the processor-executable process steps to cause the system to:
identify the object instance in the database storage marked as archived;
determine that a retention period associated with the object instance has elapsed;
in response to the determination, change a type code of the object instance in a data structure associating the object instance with a referencing object instance; and
after changing the type code, delete the object instance from the database storage.

6. A system according to claim 5, wherein selection of the object instance, transmission of the selection to an application, determination to archive the object instance, and marking the object instance as ready for archiving are performed by a first process,
wherein the identification of the object instance as ready for archiving, conversion of the object instance to an object notation format, transmission of the converted object instance to a cloud application for storage in an external storage, creation of the index object, and marking of the object instance as archived are performed by a second process, and
wherein the identification of the object instance in the database storage marked as archived, determination that the retention period associated with the object instance has elapsed, changing of the type code of the object instance, and deletion of the object instance from the database storage are performed by a third process.

7. A system according to claim 5, wherein a retention period associated with the first type of object instance is different from a retention period associated with a second type of object instance, and
wherein the first archiving configuration associated with the first type of object instance is different from a second archiving configuration associated with the second type of object instance.

8. A system according to claim 1, the processing unit to execute the processor-executable process steps to cause the system to:
determine that the object instance marked as archived in the database storage is not to be archived based on a current archiving configuration and attribute values of the object instance; and
in response to the determination that the object instance in the database storage marked as archived is not to be archived, un-mark the object instance as archived in the database storage.

9. A system according to claim 1, wherein selection of the object instance from the database storage selection comprises selection using one or more key user tools used to select objects during day-to-day operation, and
wherein the one or more key user tools provide modification of the archiving configuration based on standard object fields and extension fields.

10. A computer-implemented method comprising:
identifying a first archiving configuration of a first type of object instance, the first archiving configuration including first parameter values;
selecting an object instance of the first type of object instance from a database storage to archive to an external storage based the first archiving configuration and a comparison of the first parameter values with attribute values of the object instance;
transmitting the selection to an application associated with the object instance;
determining, based on a response received from the application, to archive the object instance;
marking the object instance as ready for archiving;
identifying the object instance as ready for archiving;
converting the object instance to an object notation format;
transmitting the converted object instance to a cloud application for storage in an external storage;
in response to a determination that the storage in the external storage is successful, creating an index object in the database storage including a subset of fields of the object instance and a link to the converted object instance stored in the external storage; and
marking the object instance in the database storage as archived.

11. A method according to claim 10, further comprising:
determining a peripheral object instance associated with the object instance;
converting the peripheral object instance to the object notation format; and
transmitting the converted peripheral object instance to the cloud application for storage in the external storage.

12. A method according to claim 10, wherein selection of the object instance, transmission of the selection to an application, determination to archive the object instance, and marking the object instance as ready for archiving are performed by a first process, and
wherein the identification of the object instance as ready for archiving, conversion of the object instance to an object notation format, transmission of the converted object instance to a cloud application for storage in an external storage, creation of the index object, and marking of the object instance as archived are performed by a second process.

13. A method according to claim 10, further comprising:
selecting a second object instance of the first type of object instance from the database storage to archive to the external storage based on the first archiving configuration and a comparison of the first parameter values with attribute values of the second object instance;
transmitting the selection of the second object instance to the application; and
determining, based on a second response received from the application, to not archive the second object instance.

14. A method according to claim 10, further comprising:
identifying the object instance in the database storage marked as archived;
determining that a retention period associated with the object instance has elapsed;
in response to the determination, changing a type code of the object instance in a data structure associating the object instance with a referencing object instance; and
after changing the type code, deleting the object instance from the database storage.

15. A method according to claim 14, wherein selection of the object instance, transmission of the selection to an application, determination to archive the object instance, and marking the object instance as ready for archiving are performed by a first process,
wherein the identification of the object instance as ready for archiving, conversion of the object instance to an object notation format, transmission of the converted object instance to a cloud application for storage in an external storage, creation of the index object, and marking of the object instance as archived are performed by a second process, and
wherein the identification of the object instance in the database storage marked as archived, determination that the retention period associated with the object instance has elapsed, changing of the type code of the object instance, and deletion of the object instance from the database storage are performed by a third process.

16. A method according to claim 14, wherein a retention period associated with the first type of object instance is different from a retention period associated with a second type of object instance, and
wherein the first archiving configuration associated with the first type of object instance is different from an archiving configuration associated with the second type of object instance.

17. A method according to claim 10, further comprising:
determining that the object instance marked as archived in the database storage is not to be archived based on a current archiving configuration and attribute values of the object instance; and
in response to determining that the object instance in the database storage marked as archived is not to be archived, un-marking the object instance as archived in the database storage.

18. A method according to claim 10, wherein selecting the object instance from the database storage selection comprises selecting using one or more key user tools used to select objects during day-to-day operation, and wherein the one or more key user tools provide modification of the archiving configuration based on standard object fields and extension fields.

19. A system comprising:

a database system comprising a database storage storing object instances, the database system to:

identify a first archiving configuration of a first type of object instance, the first archiving configuration including first parameter values;

select an object instance of the first type of object instance to archive to an external storage based on the first archiving configuration and a comparison of the first parameter values with attribute values of the object instance;

transmit the selection to an application associated with the object instance;

determine, based on a response received from the application, to archive the object instance;

mark the object instance as ready for archiving;

identify the object instance as ready for archiving;

convert the object instance to an object notation format;

transmit the converted object instance to a cloud application for storage in an external storage;

in response to a determination that the storage in the external storage is successful, create an index object in the database storage including a subset of fields of the object instance and a link to the converted object instance stored in the external storage; and mark the stored object instance as archived.

20. A system according to claim 19, the database system to:

determine a peripheral object instance associated with the object instance;

convert the peripheral object instance to the object notation format; and transmit the converted peripheral object instance to the cloud application for storage in the external storage.

21. A system according to claim 19, the database system to:

select a second object instance of the first type of object instance to archive to the external storage based on the first archiving configuration and a comparison of the first parameter values with attribute values of the second object instance;

transmit the selection of the second object instance to the application; and determine, based on a second response received from the application, to not archive the second object instance.

22. A system according to claim 19, the database system to:

identify the object instance marked as archived;

determine that a retention period associated with the object instance has elapsed;

in response to the determination, change a type code of the object instance in a data structure associating the object instance with a referencing object instance; and after changing the type code, delete the object instance from the database storage.

* * * * *